Figure 1:
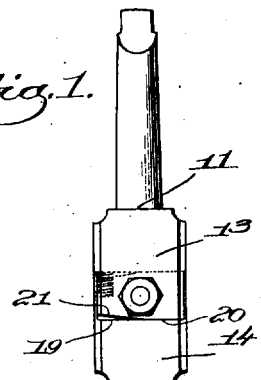

No. 890,574. PATENTED JUNE 9, 1908.
C. H. PHILLIPS.
CHUCK.
APPLICATION FILED SEPT. 11, 1907.

Witnesses:
Fred. S. Greenleaf
Joseph M. Ward

Inventor.
Charles H. Phillips,
by Crosby Gregory.
Attys

UNITED STATES PATENT OFFICE.

CHARLES H. PHILLIPS, OF BOSTON, MASSACHUSETTS, ASSIGNOR OF ONE-THIRD TO GEORGE W. GIDDINGS, OF BOSTON, MASSACHUSETTS.

CHUCK.

No. 890,574.      Specification of Letters Patent.      Patented June 9, 1908.

Original application filed March 28, 1907, Serial No. 364,975. Divided and this application filed September 11, 1907. Serial No. 392,279.

*To all whom it may concern:*

Be it known that I, CHARLES H. PHILLIPS, a citizen of the United States, residing at Boston, county of Suffolk, and State of Massachusetts, have invented an Improvement in Chucks, of which the following description, in connection with the accompanying drawing, is a specification, like letters on the drawing representing like parts.

This invention has for its object to provide a novel chuck which is especially designed to be used in connection with the drill which is shown and described in my Patent No. 864756, dated August 27, 1907. The drill illustrated in said patent is designed for drilling a hole with undercut walls, or in other words, a hole which is larger at the bottom than at the top, and said drill is provided with a centering point having a guiding edge and also with a laterally-extending cutting spur. In using the drill, it is necessary to first form in the work a conical recess of a depth slightly greater than the length of the centering point, and the desired hole can be drilled by placing the guiding edge of the centering point against one side of the conical recess formed in the work, and then rotating the drill. As the drill rotates, the cutting spur acts on the material and as the drill advances into the work, the guiding edge moves down the inclined surface of the recess and gives the drill a lateral movement. Since the drill has this lateral movement while it is operating, it is desirable to have a chuck for the drill which will permit such movement and yet which will hold the drill firmly to the work.

It is for the purpose of providing such a chuck that I have made my present invention. The chuck comprises a body portion adapted to be sustained in any drill press, and a drill-receiving portion which is pivoted to the body portion to swing relative thereto for a limited distance in one direction only, but which is held from movement in all other directions. A chuck having this construction permits the drill to have the requisite lateral movement during the drilling operation, but holds the drill rigidly in operative position.

Figure 2:
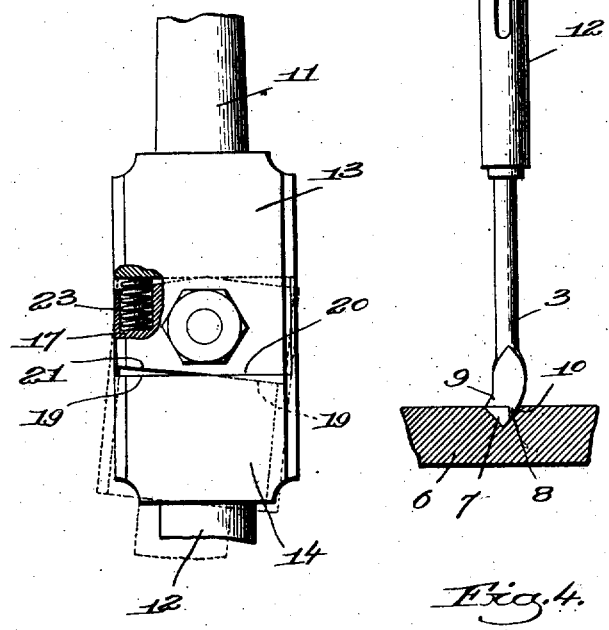
Figure 3:
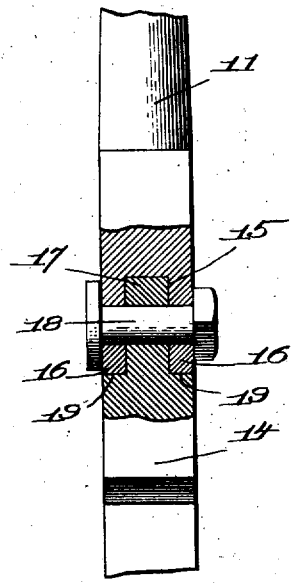
Figure 4:
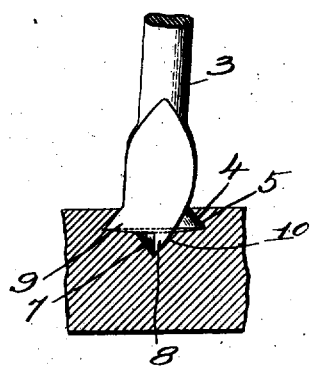

Referring now to the drawings wherein one embodiment of my invention is shown, Figure 1 represents a chuck embodying my invention having supported therein a drill such as described in my Patent No. 864756 above-mentioned; Fig. 2 is an enlarged side view of a portion of the chuck; Fig. 3 is an enlarged edge view of a portion of the chuck with a part thereof broken out to better show the construction; Fig. 4 shows the manner in which the drill operates to make the hole.

Referring to the drawings, 3 is a drill such as described and claimed in my above-mentioned patent, said drill having a centering point 8 and the laterally-extending cutting spur 9 and being adapted to make a hole 4 of the character shown in Fig. 4 with the undercut walls 5. In using this drill, the work 6 is first provided with a conical recess 7 which is of a depth slightly greater than the centering point 8, and the drill is applied to the work, as shown in Fig. 1, with the guiding edge 10 of the centering point against one side of the recess 7 and with the cutting spur 9 resting against the work. If the drill is rotated in this position, the cutting spur will cut away the material, and as the drill advances into the work the guiding edge 10 will move down the inclined surface of the recess 7 until the extremity of the centering point 8 reaches the bottom of the recess 7, as shown in Fig. 4. As the drill moves down the inclined surface of the recess it obviously has a lateral movement, and this lateral movement is that which gives the undercut walls 5.

To properly hold the drill and at the same time permit of this lateral movement thereof, I have provided the chuck herein shown which comprises the body or shank portion 11 that is adapted to be received in the chuck of an ordinary drill press, and the drill-receiving portion 12. The shank portion 11 is provided with a head 13 to which is pivotally connected the enlarged end 14 of the drill-receiving portion 12. To permit the drill-receiving portion to have the requisite lateral movement, one of the ends 13, 14, preferably the head 13, is provided with a groove 15 formed between the two ears 16 in which groove is fitted the rib 17 formed on the head 14, as plainly seen in Fig. 3, said rib being pivoted to the ears 16 by a pivotal bolt 18. The head 14 is provided with the straight shoulders 19, and the ends or edges 20 of the ears 16 are cut away slightly on one side, as shown at 21, for the purpose of permitting the drill-receiving portion to swing into the dotted line position Fig. 2.

23 is a spring which is received in the rib 17 at one side of the pivot pin 18 and which acts against the head 13, as seen in Fig. 2, said spring acting normally to hold the shoulders 19 against the straight portion 20 of the ears 16, as shown in full lines Fig. 2. The shoulders 19 are so positioned that when the parts are in the full line position Fig. 2, which is the normal position, the drill-receiving portion 12 and the shank portion 11 stand in alinement with each other, as clearly seen in Fig. 1. As soon as the drilling operation begins, however, the spring 23 permits the drill-receiving portion 12 to swing to the right, Figs. 1 and 2, thus providing for the requisite lateral movement of the drill.

Because of the fact that the rib 17 fits exactly the groove 15 between the ears 16, it will be obvious that the drill-receiving portion 12 can have a movement relative to the body portion 11 in one direction only which is the direction towards which the cutting spur 9 extends. This is an important feature of the invention because in order to make the hole as shown it is essential that the drill be prevented from moving laterally in any other direction than that toward which the cutting spur 9 is directed.

The drill-receiving portion 12 is provided with a suitable socket for receiving the shank of the drill 3, and the socket will be so formed that the drill will be properly positioned in the chuck, as shown in Fig. 1.

I have not described herein all embodiments of my invention, but have selected the preferred embodiment for the purpose of illustrating the invention.

This application is a division of my application Serial No. 364975, filed March 28, 1907, which matured into Patent No. 864756.

Having fully described my invention, what I claim as new and desire to secure by Letters Patent is:—

1. A chuck having a body or shank portion, a drill-receiving portion, and means to pivot said drill-receiving portion to the body portion so that said drill-receiving portion may swing for a limited distance in one direction only and will be held rigidly from movement relative to the body portion in all other directions.

2. A chuck comprising a body portion and a drill-receiving portion, one of said portions having a groove in its end and the other having a tongue fitting the groove, and a pivot passing through said tongue and the side walls of the groove.

3. A chuck having a body portion provided at one end with two parallel ears forming between them a groove, a drill-receiving portion having a tongue fitting between said ears, and a pivot pin extending through the tongue and ears, the ends of the ears having shoulders 20, 21 to limit the swinging movement of the drill-receiving portion.

4. A chuck comprising a body portion, a drill-receiving portion pivotally connected thereto, a stop to limit the swinging movement of said drill-receiving portion in one direction when said drill-receiving portion is in line axially with the body portion, and yielding means to hold said drill-receiving portion against said stop.

5. A chuck comprising a body portion provided at its end with two parallel ears 16 a drill-receiving portion having a rib 17 fitting between said ears, and also provided with two straight shoulders 19, a bolt pivotally connecting said rib to said ear, the lower edge of each ear being formed with the two surfaces 20, 21 at an angle to each other, and a spring acting on the two portions of the drill and normally maintaining them in axial alinement with each other with the surfaces 20 in alinement with the shoulders 19.

In testimony whereof, I have signed my name to this specification, in the presence of two subscribing witnesses.

C. H. PHILLIPS.

Witnesses:
  LOUIS C. SMITH,
  EVANGELINE C. BROWN.